(12) United States Patent
Yanai (10) Patent No.: US 8,866,948 B2
(45) Date of Patent: Oct. 21, 2014

(54) IMAGING APPARATUS

(75) Inventor: Toshikazu Yanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 12/551,194

(22) Filed: Aug. 31, 2009

(65) Prior Publication Data

US 2010/0053397 A1    Mar. 4, 2010

(30) Foreign Application Priority Data

Sep. 1, 2008   (JP) .................................. 2008-223574

(51) Int. Cl.
| | |
|---|---|
| H04N 5/335 | (2011.01) |
| H04N 5/3745 | (2011.01) |
| H04N 5/365 | (2011.01) |
| H04N 5/357 | (2011.01) |
| H04N 5/347 | (2011.01) |

(52) U.S. Cl.
CPC ............. *H04N 5/347* (2013.01); *H04N 5/3745* (2013.01); *H04N 5/3656* (2013.01); *H04N 5/3575* (2013.01)
USPC .......................................... 348/300; 348/141

(58) Field of Classification Search
USPC .......................................... 348/300, 141, 243
See application file for complete search history.

(56) References Cited

U.S. PATENT DOCUMENTS

| | | | | |
|---|---|---|---|---|
| 6,839,084 | B1* | 1/2005 | Hiyama et al. | 348/241 |
| 2003/0071908 | A1* | 4/2003 | Sannoh et al. | 348/345 |
| 2005/0052554 | A1* | 3/2005 | Sakurai et al. | 348/301 |
| 2008/0018760 | A1* | 1/2008 | Nakajima | 348/296 |
| 2008/0193049 | A1* | 8/2008 | Onomura | 382/300 |

FOREIGN PATENT DOCUMENTS

| | | |
|---|---|---|
| JP | 1-154678 A | 6/1989 |
| JP | H10-136251 A | 5/1998 |
| JP | 2000-004403 A | 1/2000 |
| JP | 2001-218105 A | 8/2001 |
| JP | 2001-245220 A | 9/2001 |
| JP | 2003-189183 A | 7/2003 |
| JP | 2005-333462 A | 12/2005 |
| JP | 2006-071741 A | 3/2006 |
| JP | 2006-352843 A | 12/2006 |
| JP | 2007-150643 A | 6/2007 |
| JP | 2009-290523 A | 12/2009 |

* cited by examiner

*Primary Examiner* — Tuan Ho
*Assistant Examiner* — Fayez Bhuiyan
(74) *Attorney, Agent, or Firm* — Canon USA, Inc. IP Division (57) ABSTRACT

In an image capture mode, a noise reading operation and image signal reading operation are used. In a photometric operation mode, the image signal reading operation is used.

7 Claims, 5 Drawing Sheets

IMAGING APPARATUS

BACKGROUND OF THE INVENTION

1. Field of the Invention

The present invention relates to an imaging apparatus such as a digital still camera or a digital video camera, and in particular, relates to an imaging apparatus enabling image capture with a reduced shutter time lag.

2. Description of the Related Art

In recent years, advances have been made with respect to higher pixel formation in image sensors used in imaging apparatuses such as digital still cameras or digital video cameras. Furthermore active research is being conducted into XY address sensors, as exemplified by complementary metal-oxide semiconductor (CMOS) sensors, provided with an amplification unit for each pixel.

Sensors provided with an amplification unit for each pixel may entail issues such as the production of noise caused by a characteristic variation in the pixel amplification unit, which may be mixed into the read-out pixel signal.

Japanese Patent Application Laid-Open No. 01-154678 discusses a sensor which eliminates this type of noise by subtracting a pixel signal output when an input to the amplification unit is reset, from the pixel signal.

For example, when reading a signal from a single horizontal pixel row, firstly the input of the pixel amplification unit for the single horizontal pixel row is reset and the resulting signal for the single horizontal row is stored as a noise signal.

Next, a single horizontal row pixel signal is read and the signal for the single horizontal row is stored separately from the noise signal. The sensor forms and outputs a group signal constituted by a pixel signal and a noise signal for each pixel. Consequently, a noise-reduced image can be produced by subtracting the noise signal from the pixel signal.

However, in Japanese Patent Application Laid-Open No. 01-154678, the time for reading operations is increased due to the necessity to read both the noise signal and the pixel signal. Consequently, when recording a still image, there may be an increase in the shutter time lag from the command for image capture to initiation of exposure for the captured image.

SUMMARY OF THE INVENTION

The present invention is directed to an imaging apparatus enabling image capture at a reduced shutter time lag.

According to an aspect of the present invention, an apparatus comprising a sensor including a plurality of pixels each of which includes a conversion element converting light into an electrical charge, an amplification unit amplifying the electrical charge, a transfer switch allowing a signal output from the conversion element to input to the amplification unit when the conversion element is switched on, a reset switch which resets an input signal of the amplification unit, and a signal output line outputting a signal of the amplification unit, and a control unit configured to control the sensor and perform selectively a first mode using a first reading operation and a second reading operation, and a second mode using the second reading operation, wherein, in the first reading operation, a first signal is output from the amplification unit to the signal output line after the reset switch is turned on when the transfer switch is off, and in the second reading operation, a second signal is output from the amplification unit to the signal output line after the transfer switch is turned on when the reset switch is off.

According to another aspect of the present invention, an apparatus includes an image sensor including a plurality of pixels each of which includes an amplification unit, and a control unit configured to control the image sensor and to perform an image capture mode and a photometric operation mode, wherein, in the image capture mode, a reading operation of a noise signal and a reading operation of a pixel signal are performed, and in the photometric operation mode, the reading operation of the noise signal is not performed and the reading operation of the pixel signal is performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
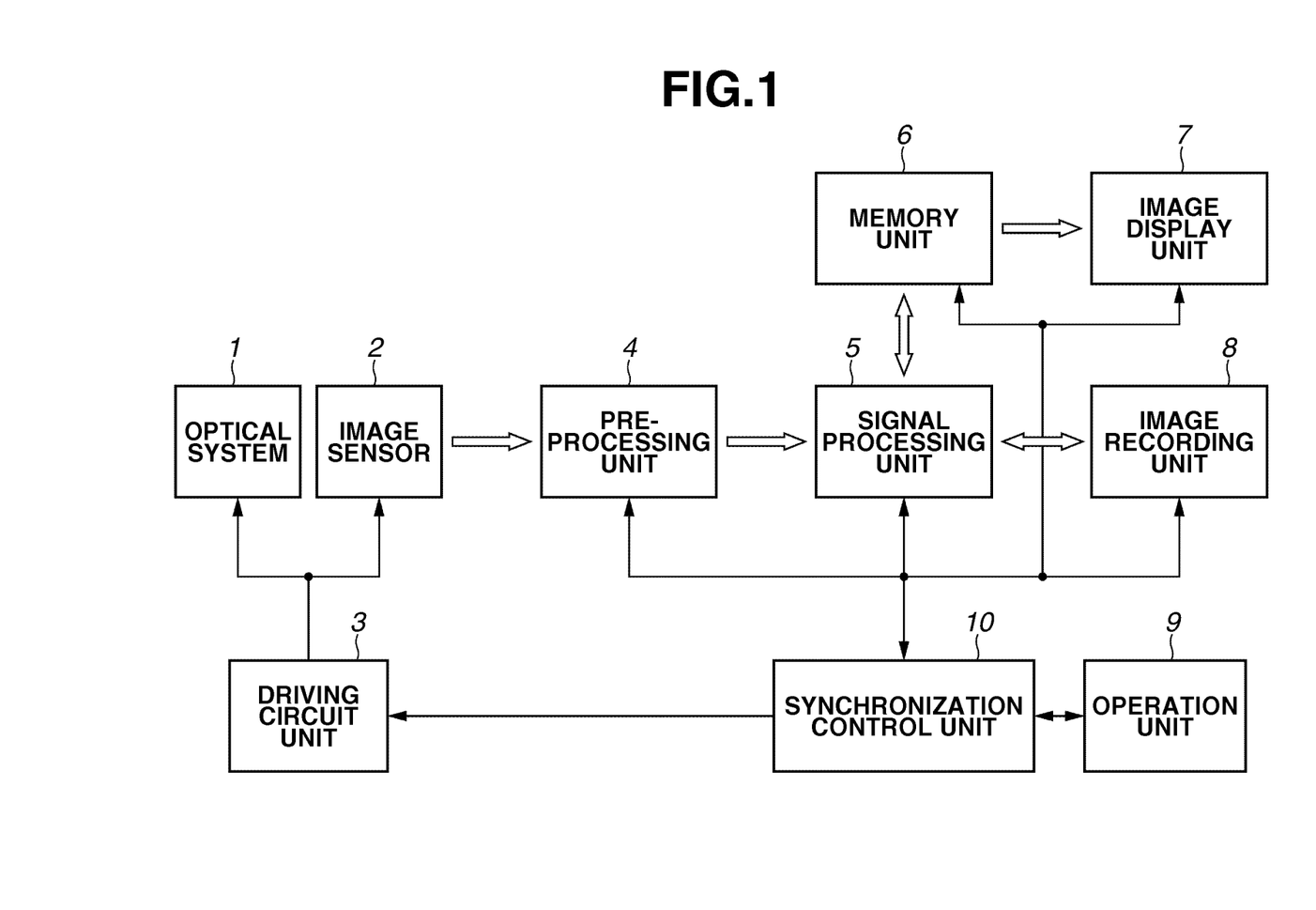
FIG. 1 is a block diagram illustrating an imaging apparatus according to a first exemplary embodiment.

FIG. 1 is a block diagram illustrating an imaging apparatus according to a first exemplary embodiment. As illustrated in FIG. 1, the imaging apparatus according to the present exemplary embodiment includes an optical system 1, an image sensor 2, driving circuit unit 3, a pre-processing unit 4, a signal processing unit 5, a memory unit 6, an image display unit 7, an image recording unit 8, an operation unit 9 and a synchronization control unit 10.

The optical system 1 has a focusing lens forming a subject image on the image sensor 2, a zoom lens performing an optical zoom, a diaphragm adjusting a brightness of the subject image, and a shutter controlling light exposure. The image sensor 2 includes a plurality of pixels arranged in horizontal and vertical directions and a circuit outputting a signal read from the pixels in a predetermined order. The image sensor 2 will be described in further detail below with reference to FIG. 2.

The drive circuit unit 3 drives the optical system 1 and the image sensor 2 by supplying a constant voltage or a pulse with an increased drive capability based on a control signal from the synchronization control unit 10. The pre-processing unit 4 is controlled by a control signal from the synchronization control unit 10 and includes a correlated double sampling circuit (CDS circuit), a gain control amplifier, and an analog to digital (A/D) conversion circuit.

The correlated double sampling circuit (CDS circuit) eliminates noise components such as reset noise contained in output signals from the image sensor 2 (analog signals). The gain control amplifier adjusts the amplitude of the output signal from which noise has been eliminated.

The A/D conversion circuit converts the adjusted-amplitude analog output signal to a digital signal. The signal processing unit 5 is controlled by a control signal from the synchronization control unit 10. The signal processing unit 5 applies a suitable signal process to convert the digitalized output signal that is transmitted from the pre-processing unit 4 into image data.

The signal processing unit 5 outputs an output signal or image data, which is converted into a digital signal, to the memory unit 6 or the image recording unit 8. The signal processing unit 5 also performs signal processing on converted digital output signals or image data received from the memory unit 6 or the image recording unit 8. The signal processing unit 5 further detects photometric data (e.g., the amount of exposure light) and the focus state using the output signal from the image sensor 2 and transmits such data to the synchronization control unit 10.

The memory unit 6 is controlled by a control signal from the synchronization control unit 10 and temporarily stores the digitally-converted output signal from the image sensor 2 or the signal-processed image data. The memory unit 6 outputs image display data to the image display unit 7.

The image display unit 7 includes an electronic view finder (EVF) and a liquid crystal display (LCD). The image display unit 7 is controlled by a control signal from the synchronization control unit 10 and displays image display data stored in the memory unit 6 to enable image composition before image capture or confirmation of images after image capture.

Generally a display pixel number of the image display unit 7 is lower than a vertical pixel number of the image sensor 2 and, in the present exemplary embodiment, the display pixel number of the image display unit 7 is also lower than the pixel number of the image sensor 2.

Peripheral units such as memory cards can be detachably attached to the image recording unit 8. The image recording unit 8 is controlled by control signals from the synchronization control unit 10 and digitally-converted image data or output signals transmitted from the signal processing unit 5 is recorded onto the memory card or read from the memory card.

The operation unit 9 can transmit to the synchronization control unit 10 commands from an external unit using an operating member such as a switch, button, or dial. The commands indicate, for example, the state of a mode dial for selecting image capture mode, the state of a button for instructing an image capture, or the state of a power source for the imaging apparatus.

The operation unit 9 transmits to the synchronization control unit 10 commands such as for image display prior to image capture, various instructions for image capture, display of captured images, or menu operations for instruction in advance the operation of the imaging apparatus.

The operation unit 9 is controlled by a control signal from the synchronization control unit 10 and can display the state of the imaging apparatus by using a display unit such as an LCD or LED or the image display unit 7. The image display unit 7 may be used as a display unit and on-screen operations may be employed using a touch panel mounted on the image display unit 7 as an operation member.

The synchronization control unit 10 controls the overall imaging apparatus according to instructions from the operation unit 9. The synchronization control unit 10 controls the optical system 1 according to photometric data such as the amount of exposure light or the focus state transmitted from the signal processing unit 5 and forms an optimal subject image on the image sensor 2.

The synchronization control unit 10 detects the usage status of the memory unit 6 and the attachment status or usage status of a memory card or the like which can be detachably attached to the image recording unit 8.

The operation of the imaging apparatus according to the present embodiment will be described below.

Control of Display Image (1) Power is switched on in response to an instruction from the power switch of the operation unit 9.
(2) Image signals from the image sensor 2 are converted into image display data by the signal processing unit 5 and displayed on the image display unit 7. Photometric data is detected and transmitted to the synchronization control unit 10.
(3) The synchronization control unit 10 controls the optical system 1 via the drive circuit unit 3 with reference to the photometric data.
(4) The operations in (2) and (3) are repeated while waiting for instructions from the operation unit 9.

Control of Still Image Capture (1) Control for still image capture is commenced by an instruction from an image capture switch of the operation unit 9.
(2) The signal processing unit 5 detects photometric data using an image signal output from the image sensor 2 and transmits the data to the synchronization control unit 10.
(3) The synchronization control unit 10 controls the optical system 1 via the drive circuit unit 3 with reference to the photometric data.
(4) The image sensor 2 is exposed by light from a subject and outputs a signal for still image recording.
(5) The image signal from the image sensor 2 is converted by the signal processing unit 5 into image data for recording, transmitted to the image recording unit 8 and recorded in a detachable memory card or the like. Alternatively, it is converted into image display data and displayed on the image display unit 7.
(6) Returns to display image control.

Figure 2:
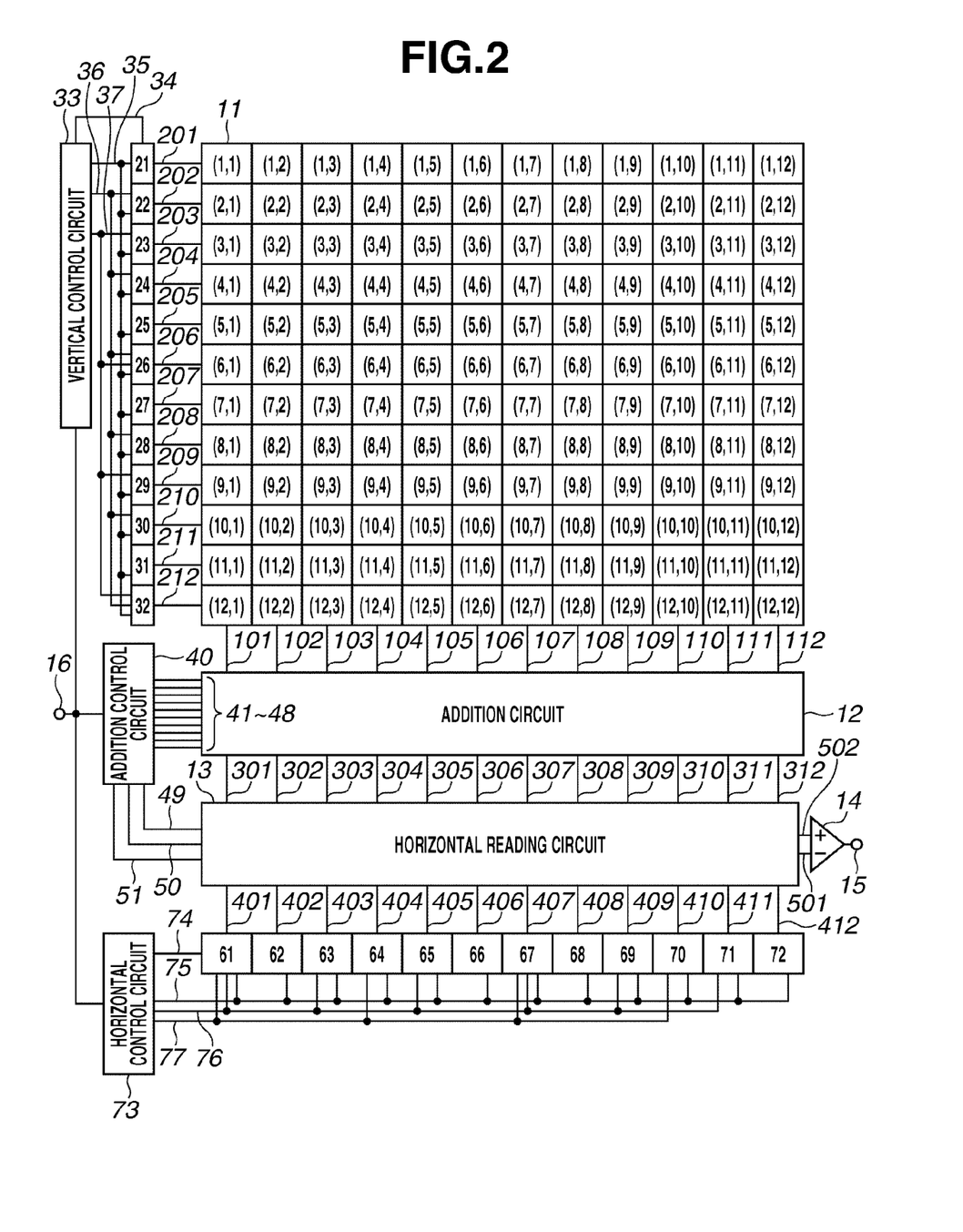
FIG. 2 illustrates an image sensor according to the first exemplary embodiment.

Next, the image sensor 2 will be described in further detail with reference to FIG. 2 to FIG. 5. In FIG. 2, for the sake of simplicity of description, the size of the image sensor 2 is 12 horizontal pixels×12 vertical pixels.

In FIG. 2, a pixel 11 illustrates a single pixel that converts incident light into an electrical signal and the address indicating the position of the pixel with respect to a horizontal direction (H) and a vertical direction (V) is expressed as (1, 1).

The configuration of all pixels is the same as the pixel 11 with the exception that vertical control lines and vertical signal lines are different for each corresponding pixel and the address indicating a pixel position is expressed as (H, V).

Figure 3:
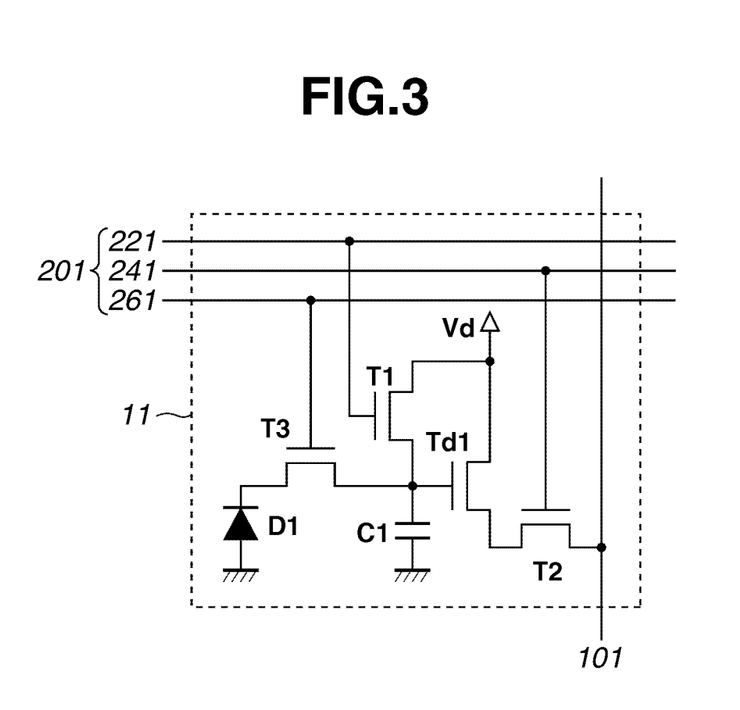
FIG. 3 illustrates an example configuration of pixels of an image sensor.

FIG. 3 illustrates an example configuration of pixel 11. In FIG. 3, the pixel 11 is illustrated by the section enclosed by the dotted line. The pixel 11 is connected with other circuits by a vertical control line 201 and a vertical signal line 101.

The vertical control line 201 is connected in common to a single horizontal row of pixels and performs simultaneous control of the single horizontal pixel row. The vertical signal line 101 is connected in common to a single vertical column of pixels and outputs a pixel signal. The vertical control line 201 includes a reset control line 221, a vertical address line 241, and a transfer control line 261.

A photoelectric conversion element D1 converts light into an electrical charge. The floating diffusion (FD) capacitor C1 accumulates electrical charges when a charge from the photoelectric conversion element D1 is converted into a voltage. A drive transistor (amplification unit) Td1 is a transistor driving an in-pixel amplifier and outputs a voltage according to a voltage of the FD capacitor C1. A reset transistor (reset switch) T1 is connected to the reset control line 221 and resets the voltage of the FD capacitor C1.

A selection transistor (selection switch) T2 is connected to the vertical address line 241 and outputs an output of the drive transistor Td1 as a pixel output signal to the vertical signal line 101.

A transfer transistor (transfer switch) T3 is connected to the transfer control line 261 and controls the transfer of electrical charge from the photoelectric conversion element D1 to the FD capacitor C1. The power source Vd is the power source for the drive transistor Td1 and the reset transistor T1.

In the present exemplary embodiment, transistors other than the drive transistor Td1 operate as a switch allowing or cutting off current flow when a control line connected to a gate is respectively on or off.

Next, image signal reading and noise reading processes in the image sensor 2 will be described. Firstly a noise reading process will be described with reference to reading of a single horizontal row of pixels of the image sensor 2.

A vertical control line controls all pixels in a single horizontal row. Although the example of a pixel (1, 1) will be described below, the description is applicable to the operation of other pixels.

When the transfer transistor T3 is off, after the reset transistor T1 is switched on by the reset control line 221 and the voltage of the FD capacitor C1 is reset, the reset transistor T1 is switched OFF.

Next, the selection transistor T2 is switched on by the vertical address line 241 and a reset voltage for the FD capacitor C1 is output to the vertical signal line (signal output line) 101. The signal is a noise signal (first signal) and the reading operation of the noise signal (first reading operation) is defined as "noise reading". The selection transistor T2 may be switched off by the vertical address line 241.

Next, reading of a pixel signal will be described. When the transfer transistor T3 is switched on by the transfer control line 261 while the reset transistor T1 is off, an electrical charge is transferred from the photoelectric conversion element D1 to the FD capacitor C1.

The noise signal produced by the FD capacitor C1 is added to the electrical charge transferred from the photoelectric conversion element D1 and undergoes charge/voltage conversion as a pixel signal.

Then the selection transistor T2 is switched on by the vertical address line 241 and a signal voltage from the FD capacitor C1 is output to the vertical signal line 101. This signal is a pixel signal (second signal) and the reading operation of a pixel signal (second reading operation) is defined as "pixel signal reading". The selection transistor T2 may be switched off by the vertical address line 241.

The description above contains separate definitions for noise reading and pixel signal reading. However a series of operations from noise reading to pixel signal reading may be defined in the following manner as continuous signal reading.

In continuous signal reading, firstly noise reading is performed. When a single horizontal row of pixels of the image sensor 2 is read, while the transfer transistor T3 is off, after the reset transistor T1 is switched on by the reset control line 221 and the voltage of the FD capacitor C1 is reset, the reset transistor T1 is switched off.

Then the selection transistor T2 is switched on by the vertical address line 241 and a reset voltage from the FD capacitor C1 is output to the vertical signal line 101. The signal is a noise signal. In this state, since the reset transistor T1 is off, pixel signal reading is performed thereafter.

When the transfer transistor T3 is switched on by the transfer control line 261, an electrical charge is transferred from the photoelectric conversion element D1 to the FD capacitor C1. The noise signal produced by the FD capacitor C1 is added to the electrical charge transferred from the photoelectric conversion element D1 and undergoes charge/voltage conversion as a pixel signal.

Since the selection transistor T2 remains in the ON state during these operations, the added signal voltage from the FD capacitor C1 is output to the vertical signal line 101 as a pixel signal. The selection transistor T2 may be switched off by the vertical address line 241.

Referring again to FIG. 2, the vertical shift registers 21-32 can select vertical control lines 201-212 connected to the pixels to be read-out.

The vertical control circuit 33 controls the vertical shift registers 21-32 according to instructions from the synchronization control unit 10 via the control input terminal 16. The vertical shift register control line 34 can instruct any one of "one row reading operation", "two row addition operation", or "three row addition operation" to the vertical shift registers 21-32.

Of the vertical register selection lines 35-37, the vertical register selection line 35 can select all vertical shift registers 21-32. The vertical register selection line 36 can select the vertical shift registers 22, 24, 26, 28, 30, and 32.

The vertical register selection line 37 can select the vertical shift registers 23, 26, 29, and 32.

For example, when the vertical shift register control line 34 instructs a "one row reading operation" and the vertical register selection line 35 is selected, the vertical shift registers 21-32 can be controlled to select the vertical control lines 201-212 in sequence.

When the vertical shift register control line 34 instructs a "one row reading operation" and the vertical register selection line 36 is selected, the vertical shift registers 21-32 can be controlled to select the vertical control lines 202, 204, 206, 208, 210, and 212 in sequence.

When the vertical shift register control line 34 instructs a "one row reading operation" and the vertical register selection line 37 is selected, the vertical shift registers 21-32 can be controlled to select the vertical control lines 203, 206, 209, and 212 in sequence.

When the vertical shift register control line 34 instructs a "two row addition operation" and the vertical register selection line 35 is selected, the vertical shift registers 21-32 can be controlled so that the vertical control lines 201-212 synchronously select two rows during a one-row reading operation.

In this manner, a vertical signal line outputs a signal in which two pixel signals are added and averaged in a vertical direction.

When the vertical shift register control line 34 instructs a "three row addition operation" and the vertical register selection line 35 is selected, the vertical shift registers 21-32 can be controlled so that the vertical control lines 201-212 synchronously select three rows during a one-row reading operation.

In this manner, a vertical signal line outputs a signal in which three pixel signals are added and averaged in a vertical direction.

The addition circuit 12 can add signals read from the pixels transmitted to the vertical signal lines 101-112. The addition control circuit 40 controls the addition circuit 12 according to instructions from the synchronization control unit 10 via control input terminal 16. The addition control lines 41-48 control the addition circuit 12.

A horizontal reading circuit 13 is controlled by the horizontal control lines 401-412 and can transmit an addition signal from the addition circuit 12 via the addition output lines 301-312 to the output circuit 14.

The output circuit 14 includes a current amplification circuit and a voltage amplification circuit, which suitably amplify the current or voltage of transmitted signals and output the amplified signal to the pre-processing unit 4 via the output terminal 15. The horizontal reading control line 49-51 controls the horizontal reading circuit 13.

The horizontal shift register 61-72 can select the horizontal control lines 401-412. The horizontal control circuit 73 controls the horizontal shift registers 61-72 according to instructions by the synchronization control unit 10 through the control input terminal 16. The horizontal shift register control line 74 can instruct either one of "operation with noise reading" or "operation without noise reading" as described below to the horizontal shift registers 61-72.

Of the horizontal register selection lines 75-77, the horizontal register selection line 75 can select all horizontal shift registers 61-72. The horizontal register selection line 76 can select the horizontal shift registers 61, 63, 65, 67, 69, and 71. The horizontal register selection line 77 can select the horizontal shift registers 61, 64, 67, and 70.

For example, when the horizontal register selection line 75 is selected, the horizontal shift registers 61-72 can be controlled so that the horizontal control lines 401-412 are selected in sequence in response to an operation start instruction from the horizontal shift register control line 74.

When the horizontal register selection line 76 is selected, the horizontal shift registers 61-72 can be controlled so that the horizontal control lines 401, 403, 405, 407, 409, and 411 are selected in sequence in response to an operation start instruction from the horizontal shift register control line 74.

When the horizontal register selection line 77 is selected, the horizontal shift registers 61-72 can be controlled so that the horizontal control lines 401, 404, 407, and 410 are selected in sequence in response to an operation start instruction from the horizontal shift register control line 74.

Figure 4:
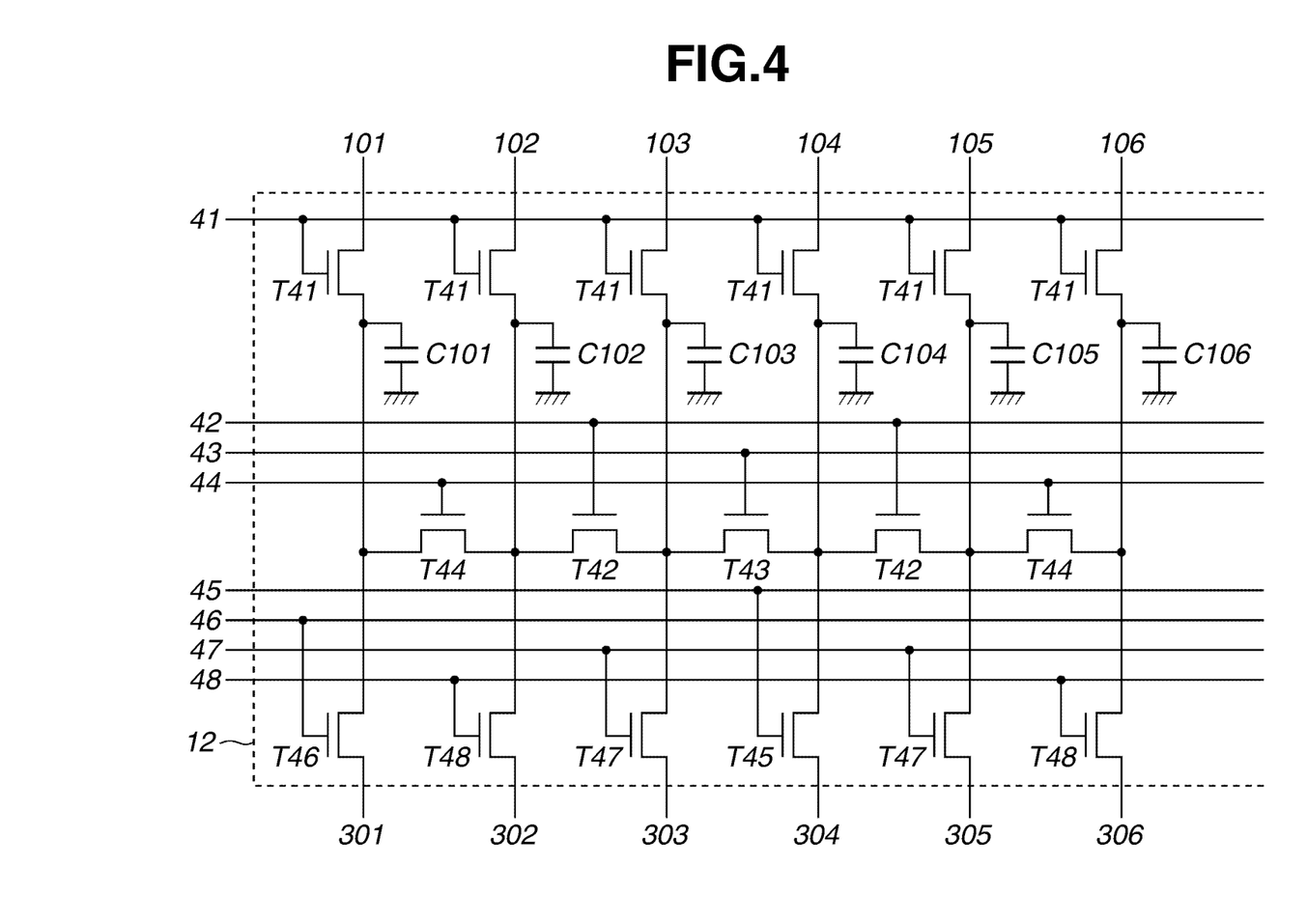
FIG. 4 illustrates an example configuration of an addition circuit.

FIG. 4 illustrates an example configuration of an addition circuit 12. In FIG. 4, although only the section corresponding to the 6 pixels on the left side of FIG. 2 is described, the 6 pixels on the right side have the same configuration.

Transistors T41-T48 in FIG. 4 function as switches allowing or cutting off current flow by switching on or off by addition control lines 41-48 having the corresponding number.

The storage capacitors C101-C106 (for the 6 pixels on the right side, the storage capacitors C107-C112 (not illustrated)) store signals read from pixels transmitted from the vertical signal lines 101-106 (for the 6 pixels on the right side, the vertical signal lines 107-112 (FIG. 2)).

The addition output lines 301-306 (for the 6 pixels on the right side, the addition output lines 307-312 (FIG. 2)) are output lines for outputs from the addition circuit 12.

Next referring to FIG. 4, an example of the operation of the addition circuit 12 will be described. Firstly, controlled by the addition control line 41, the transistor T41 is switched on, and after the signals read from the pixels and transmitted from the vertical signal lines 101-106 are stored in the storage capacitor C101-C106, the transistor T41 is switched off.

When not performing an addition operation, according to the control performed by the addition control lines 45-48, the transistors T45-T48 are switched on and signals from the storage capacitors C101-C106 are output to the addition output lines 301-306, respectively.

When performing horizontal 2-pixel addition, according to the control performed by the addition control lines 43, 44, the transistors T43 and T44 are switched on. According to the control performed by the addition control lines 46 and 47, the transistors T46 and T47 are switched on. In this manner, pairs of addition-average signals from the storage capacitors C101-C106 are output to the corresponding addition output lines 301, 303, and 305.

When performing horizontal 3-pixel addition, according to the control performed by the addition control lines 42 and 44, the transistors T42 and T44 are switched on. According to the control performed by the addition control lines 45 and 46, the transistors T45 and T46 are switched on. In this manner, triplets of addition-average signals from the storage capacitors C101-C106 are output to the corresponding addition output lines 301 and 304.

Figure 5:
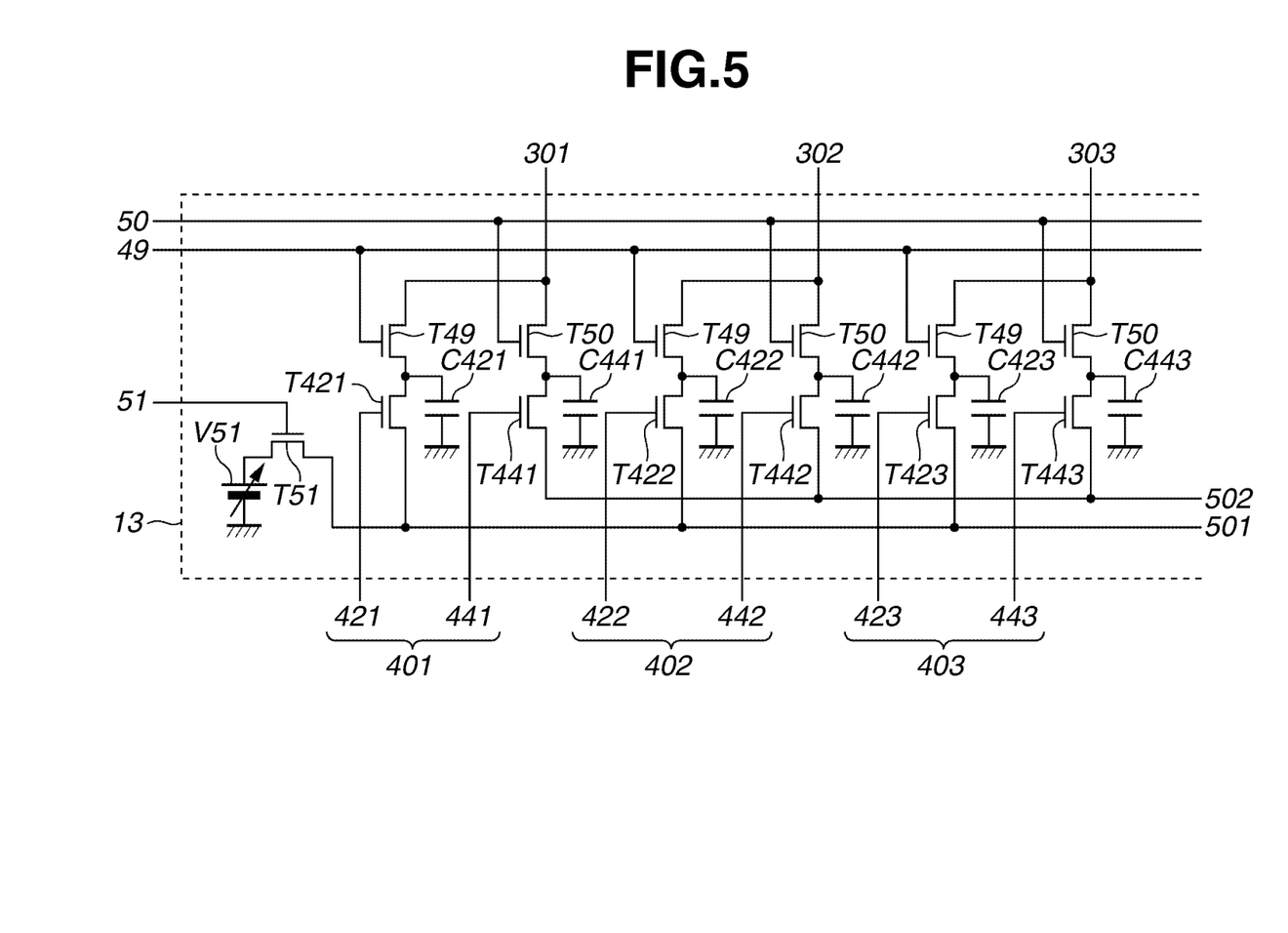
FIG. 5 illustrates an example configuration of the horizontal reading circuit.

FIG. 5 illustrates an example configuration of the horizontal reading circuit 13. Only a section corresponding to the left 3 pixels in FIG. 2 will be described with reference to FIG. 5. However the description is applicable to the operation of the remaining 9 pixels in the right side. The transistors T49-T51 function as switches allowing or cutting off current flow by switching on or off controlled by addition control lines 49-51 having the corresponding number.

The transistors T421-T423 (for the 9 pixels in the right side, T424-T432) function as switches allowing or cutting off current flow by switching on or off controlled by the noise control lines 421-423 (for the 9 pixels on the right side, the control lines 424-432) having the corresponding number.

The transistors T441-T443 (for the 9 pixels on the right side, T444-T452) function as switches allowing or cutting off current flow by switching on or off controlled by control lines 441-443 (for the 9 pixels on the right side, the control lines 444-452) having the corresponding number.

The horizontal control lines 401-403 (for the 9 pixels on the right side, the horizontal control lines 407-412) are illustrated together with the corresponding noise control lines 421-423 (for the 9 pixels on the right side, the noise control lines 424-432) and the signal control lines 441-443 (for the 9 pixels on the right side, the signal control lines 444-452).

The storage capacitors C421-C423 (for the 9 pixels on the right, C424-C432) and C441-C443 (for the 9 pixels on the right, C444-C452) store signals transmitted via the transistors T49, T50.

The variable voltage source V51 supplies a predetermined voltage to the horizontal noise line 501. The output circuit 14 illustrated in FIG. 2 functions as a difference amplifier receiving the input of the horizontal noise line 501 and the horizontal signal line 502. The output circuit 14 performs suitable amplification of the current and voltage of a differential signal and outputs the resulting signal to the pre-processing unit 4 via the output terminal 15.

Next, referring to FIG. 5, the operation of the horizontal reading circuit 13 will be described. When noise is read by the horizontal reading circuit 13, according to the control performed by the horizontal reading control line 49, the transistor T49 is switched on, and after the storage capacitors C421-C423 stores the noise signal transmitted via the addition output lines 301-303, the transistor T49 is switched off.

When an image signal is read by the horizontal reading circuit 13, according to the control performed by the horizontal reading control line 50, the transistor T50 is switched on, and after the image signal transmitted via the addition output lines 301-303 is stored in the storage capacitors C441-C443, the transistor T50 is switched off.

Next, the instructions "operation with noise reading" and the "operation without noise reading" performed by the horizontal reading circuit 13 as illustrated in FIG. 2 will be described. When "operation with noise reading" is instructed by the control signal from the synchronization control unit 10, the horizontal shift register control line 74 controls the horizontal shift registers 61-72.

Both the noise control lines (in FIG. 5, 421-423) and the signal control lines (in FIG. 5, 441-443) via the corresponding horizontal control lines 401-412 transmit instructions to control the transistors T421-T423, T441-T443.

Consequently the horizontal control lines 401-412 (in FIG. 5, signal control lines 443 and noise control lines 421-423 of the horizontal control lines 401-403) are selected in sequence according to the operation start instruction from the horizontal shift register control line 74.

The image signals stored in the storage capacitor C441-C443 and the noise signal stored in the storage capacitor C421-C423 corresponding to the selected horizontal control line are output respectively to the horizontal noise line 501 and the horizontal signal line 502.

In this manner, the differential output of the image signal and the noise signal corresponding to one horizontal row is output via the output circuit 14.

Next, when "operation without noise reading" is instructed by the control signal from the synchronization control unit 10, the horizontal shift register control line 74 controls the horizontal shift registers 61-72.

The signal control line (in FIG. 5, signal control lines 441-443) in the corresponding horizontal control line 401-412 transmits an instruction to control the transistors T441-T443 illustrated in FIG. 5.

According to the control performed by the horizontal reading control line 51, the transistor T51 is switched on in response to a control signal from the synchronization control unit 10 and a predetermined voltage set by the variable voltage source V51 is applied to the horizontal noise line 501.

In this manner, the horizontal control lines 401-412 (in FIG. 5, the signal control lines 441-443 of the horizontal control lines 401-403) are selected in sequence in response to the operation start instruction from the horizontal shift register control line 74.

Image signals stored in the storage capacitors C441-C443 corresponding to the selected horizontal control line is output to the horizontal signal line 502.

On the other hand, the horizontal noise line 501 carries a predetermined voltage set by the variable voltage source V51. In this manner, a differential output between a predetermined voltage set by the variable voltage source V51 and an image signal corresponding to one horizontal row is output via the output circuit 14.

For the predetermined voltage set by the variable voltage source V51, an average value for a noise signal output after noise reading may be calculated in advance and may be used as the predetermined voltage.

Next, a still image capture mode, which reads all pixels and corresponds to "Control of Still Image Capture" (4) described above, will be described. After exposure, in the image sensor 2, the vertical shift register control line 34 selects the vertical control lines 201-212 in sequence by instructing a "one-row reading operation" and selecting the vertical register selection line 35.

With this operation, the pixels of the first row of the image sensor 2 are read. However noise reading of one horizontal line is performed prior to the image signal reading. Since addition is not performed in still image capture mode (first mode), the addition circuit 12 transmits the noise signal without modification to the horizontal read circuit 13.

In the horizontal reading circuit 13, the transistor T49 is switched on by the horizontal reading control line 49, and after the noise signals transmitted from the addition output line 301 are stored in the storage capacitors C421-C423, the transistor T49 is switched off. Thus, noise reading process is performed.

Next, a pixel signal reading operation is performed on the same row on which noise reading was performed. Since addition operations are not performed in still image capture mode, the addition circuit 12 transmits pixel signals without modification to the horizontal reading circuit 13.

In the horizontal reading circuit 13, the transistor T50 is switched on by the horizontal reading control line 50, and after the image signals transmitted from the addition output line 301 are stored in the storage capacitors C441-C443, the transistor T50 is switched off. Thus, image signal reading process is performed.

In the present exemplary embodiment described above, although noise reading was performed separately to image signal reading, as described with reference to FIG. 3, a series of operations from noise reading to image signal reading may be performed as continuous signal reading.

Thereafter, when "operation with noise reading" is instructed and the horizontal register selection line 75 is selected, the horizontal control lines 401-412 are selected in sequence by an operation start instruction from the horizontal shift register control line 74.

At this time, since "operation with noise reading" is instructed, for example, both the noise control line 421 and the signal control line 441 indicated by the horizontal control line 401 operate effectively. The noise signal is transmitted to the output amplifier 14 via the horizontal noise line 501, and the image signal is transmitted to the output amplifier 14 via the horizontal signal line 502. A differential output of the image signal and the noise signal is output as the output of the image sensor 2.

Reading of pixels of the first row is performed by repeating the operation described above. The still image capture mode is terminated when this operation has been performed with respect to all pixels.

In the present exemplary embodiment, still picture capture mode performs an operation in which a noise signal when the FD capacitor C1 is reset is subtracted from a pixel signal. The FD capacitor C1 corresponds to the input of the drive transistor Td1 of the in-pixel amplifier functioning as a pixel amplification unit. In this manner, noise produced by the in-pixel amplifier can be effectively eliminated.

Next the photometric operation corresponding to "Control of Still Image Capture" (2) above will be described. In the photometric operation, a photometric operation mode (second mode) is performed, in which an image capturing is performed for determining light exposure conditions for the image sensor 2.

In the photometric operation mode, noise reading is not performed. Only pixel signal reading and 9-pixel addition of horizontal 3-pixel and vertical 3-pixel addition is performed.

In the image sensor 2, the vertical shift register control line 34 instructs a "three row addition operation" and selects a vertical register selection line 35 in order to synchronously select three lines of the vertical control lines 201-212 in sequence.

At this time, image signal reading is performed in photometric operation mode. In this operation, a signal, which is generated by adding and averaging 3-pixel images, in a vertical direction is output to the vertical signal line.

Pixels (1, 1), (2, 1), (3, 1), (1, 2), (2, 2), (3,2), (1, 3), (2, 3) and (3, 3) from among the pixels selected together with three rows will be described. Other pixels are subsequently subjected to vertical image addition using the same operation.

Hereinafter, an addition-average signal of the pixels (1, 1), (2, 1), and (3, 1) is called a vertical addition image signal 11 and an addition-average signal of the pixels (1, 2), (2, 2), and (3, 2) is called a vertical addition image signal 12. An addition-average signal of the pixels (1, 3), (2, 3), and (3, 3) is termed a vertical addition image signal 13. The vertical addition image signals 11-13 are output to the corresponding vertical signal lines 101-103.

Next, the vertical addition image signals 11-13 are added to the vertical addition image signals output to the vertical signal lines 101-103 by instructing the horizontal 3-pixel addition in the addition circuit 12. Consequently 9-pixel addition of horizontal 3-pixel×vertical 3-pixel addition is performed and the resulting signal is transmitted to the horizontal reading circuit 13 via the addition output line 301.

In the horizontal reading circuit 13, the transistor T50 is switched on by the horizontal reading control line 50, and after the image signal transmitted from the addition output line 301 is stored in the storage capacitor C441, the transistor T50 is switched off. Thus, Imaging signal reading of 9-pixel addition signals is performed.

Thereafter, when "operation without noise reading" is instructed and the horizontal register selection line 77 is selected, the horizontal control lines 401, 404, 407 and 410 are selected in sequence by an operation start instruction from the horizontal shift register control line 74.

At this time, since "operation without noise reading" is instructed, for example, of the noise control line 421 and the signal control line 441 indicated by the horizontal control line 401, only the signal control line 441 operates effectively. The image signal is transmitted to the output amplifier 14 through the horizontal signal line 502.

Since in "operation without noise reading", a predetermined voltage set by the variable voltage source V51 is applied to the horizontal noise line 501, the predetermined voltage is transmitted to the output amplifier 14.

In this manner, the differential output of the predetermined voltage set by the variable voltage source V51 and the 9-pixel added image signal is output as the output signal of the image sensor 2. Reading of a single row of added pixels is performed by repeating this operation in a horizontal direction. The photometric operation mode is completed by repeating the operation on all pixels.

Since the noise signal is not subtracted from the image signal in photometric operation mode, the reading operation time is shortened in comparison to an operation including subtraction of a noise signal.

As a result, image capture can be performed with a reduced time lag existing between the instruction for image capture and initiation of light exposure for the captured image. In addition, since there is no noise signal subtraction operation, the image signal read from the image is a signal including noise.

Generally since noise produced during imaging is known to be averaged by addition processes, in the present exemplary embodiment, only pixel reading and a 9-pixel addition of horizontal 3-pixel by vertical 3-pixel addition are performed. Thus, noise in the added pixel signal can be reduced.

In the photometric operation mode, since an average voltage from the noise signal output, which is set by the variable voltage source V51, is applied to the horizontal noise line 501, further reduction is possible in the noise contained in the added pixel signal output from the sensor.

Dividing the imaging region into a plurality of regions and applying an integration value for a signal in each respective region enables further reduction of the effect of noise in each pixel when detecting photometric data for auto-white-balance or auto-exposure in the signal processing unit 5.

In the photometric operation mode according to the present embodiment, although 9-pixel addition is performed, a larger number of pixel addition is possible by extending the configuration of the image sensor 2 and in this manner, the noise reduction effect can be further increased.

An imaging apparatus according to a second exemplary embodiment of the present invention will be described below. In this embodiment, since the basic operation and configuration of the image sensor and the basic operation and configuration of the imaging apparatus are the same as those described in the first exemplary embodiment, the same figures and reference numerals will be used in the description below.

In the photometric operations of an imaging apparatus according to this embodiment, a first photometric operation mode and a second photometric operation mode are used. The first photometric operation mode only performs image signal reading together with 9-pixel addition of horizontal 3-pixel× vertical 3-pixel addition. The second photometric operation mode only performs image signal reading together with 4-pixel addition of horizontal 2-pixel by vertical 2-pixel addition.

Since the first photometric operation mode performing 9-pixel addition is similar to the photometric operation mode according to the first exemplary embodiment, additional description will be omitted and only the second photometric operation mode will be described.

In the image sensor 2, when the vertical shift register control line 34 instructs a "two row addition operation" and the vertical register selection line 35 is selected, the vertical control lines 201-212 synchronously select two rows in sequence.

Pixel signal reading is performed in the second photometric operation mode. Consequently this operation causes the vertical signal line to output an addition-average vertical 2-pixel signal. Pixels (1, 1), (2, 1), (1, 2), (2, 2), (1, 3), (2, 3), (1, 4) and (2,4) will be described of the pixels during two-row synchronous selection. With the same operation, vertical image addition operation is applied to the subsequent pixels.

Hereinafter, an addition-average signal of the pixels (1, 1) and (2, 1) is called a vertical addition image signal 21 and an addition-average signal of the pixels (1, 2) and (2, 2) is called a vertical addition image signal 22. An addition-average signal of the pixels (1, 3) and (2, 3) is called a vertical addition image signal 23 and an addition-average signal of the pixels (1, 4) and (2, 4) is termed a vertical addition image signal 24. These vertical addition image signals 21-24 are output to the corresponding vertical signal lines 101-104.

When the addition circuit 12 performs horizontal 2-pixel addition and outputs vertical addition image signals to the vertical signal lines 101-104, the signals are respectively added as vertical addition image signals 21, 22 and vertical addition image signals 23, 24.

Thereafter, a signal created by 4-pixel addition by horizontal 2-pixel and vertical 2-pixel addition is transmitted to the horizontal reading circuit 13 through the addition output lines 301, 303. The horizontal reading control line 50 switches on the transistor T50 in the horizontal reading circuit 13, and after the storage capacitor C441, C443 stores the image signals transmitted from the addition output lines 301, 303, the transistor T50 is switched off. Thus, the reading of 4-pixel addition images is performed.

Thereafter, when "operation without noise reading" is instructed and the horizontal register selection line 76 is selected, the horizontal control lines 401, 403, 405, 407, 409 and 411 are selected in sequence by an operation start instruction from the horizontal shift register control line 74.

At this time, since "operation without noise reading" is instructed, for example, of the noise control line 421 and the signal control line 441 indicated by the horizontal control line 401, only the signal control line 441 operates effectively and the image signal is transmitted to the output amplifier 14 through the horizontal signal line 502.

In "operation without noise reading", since a predetermined voltage set by the variable voltage source V51 is applied to the horizontal noise line 501, the predetermined voltage is transmitted to the output amplifier 14. In this manner, a differential output between the 4-pixel addition image signal and the predetermined voltage set by the variable voltage source V51 is output as the output of the image sensor 2.

Reading of a single row of added pixels is performed by repeating the above operation in a horizontal direction. The second photometric operation mode is completed when this operation is performed on all pixels. In this manner, a 4-pixel added signal is output from the image sensor 2. With the 4-pixel addition operation, a noise reduction effect is obtained, though the effect is less than that of the 9-pixel addition operation.

In this manner, when a first photometric operation mode performing 9-pixel addition and a second photometric operation mode performing 4-pixel addition can be selected, the synchronization control unit 10 can select a suitable addition number according to the brightness of the subject image, the number of data, and the level of noise reduction.

Since the second photometric operation mode does not include an operation to subtract a noise signal from a pixel signal, time consumed for the reading operation is reduced in comparison with operations that include subtraction of noise signals. As a result, image capture can be performed with a reduced shutter time lag, which corresponds to the time from the instruction of image capture to initiation of light exposure.

Dividing the imaging region into a plurality of regions and using an integration value for a signal in each respective region enable further reduction of the effect of noise in each pixel when detecting photometric data for AWB or AE in the signal processing unit 5.

As described above, according to the present exemplary embodiment, an operation for subtracting noise is omitted when performing photometric operations in an imaging apparatus in which noise is removed by performing a noise subtraction operation on an image signal.

In this manner, a reduction in the photometric operation time is achieved and image capture is possible with a reduced shutter time lag. In addition, the present exemplary embodiment described above enables noise reduction by addition of a plurality of pixel signals during photometric operations.

While the present invention has been described with reference to exemplary embodiments, it is to be understood that the invention is not limited to the disclosed exemplary embodiments. The present invention may be applicable to a various apparatus, such as a digital still camera, a digital compact camera, a video camera, a web camera, and a built-in camera function of a cellular phone. The scope of the following claims is to be accorded the broadest interpretation so as to encompass all modifications, equivalent structures, and functions.

This application claims priority from Japanese Patent Application No. 2008-223574 filed Sep. 1, 2008, which is hereby incorporated by reference herein in its entirety.

What is claimed is:

1. An imaging apparatus comprising
an image sensor including a plurality of pixels, a plurality of signal output lines which output signals of the plurality of pixels, and a voltage source configured to apply a predetermined voltage, wherein each of the pixels includes a conversion element converting light into electrical charges, a floating diffusion unit accumulating the electrical charges, an amplification unit amplifying signals according to the electrical charges of the floating diffusion unit, a transfer switch transferring the electric charges from the conversion element to the floating diffusion unit, a reset switch which resets the floating diffusion unit; and
a control unit configured to control the sensor and perform selectively an image capture mode using a first reading operation and a second reading operation, and a photometric operation mode using the second reading operation,
wherein, in the first reading operation, first signals are output from the amplification unit to the signal output line after the reset switch is turned on in a case that the transfer switch is off, and in the second reading operation, second signals are output from the amplification unit to the signal output line after the transfer switch is turned on in a case that the reset switch is off,
and wherein in the photometric operation mode, the control unit controls the voltage source to apply the predetermined voltage instead of the first signals.

2. The imaging apparatus according to claim 1, wherein the first signal is a noise signal and the second signal is an image signal.

3. The imaging apparatus according to claim 1, further comprising an averaging unit which averages the signals of the plurality of pixels, wherein in the photometric operation mode, the control unit controls the averaging unit of the image sensor to average the second signals.

4. The imaging apparatus according to claim 1, wherein the second mode uses only the second reading operation.

5. An apparatus comprising:
an image sensor including a plurality of pixels and a voltage source configured to apply a predetermined voltage; and
a control unit configured to control the image sensor and to perform an image capture mode and a photometric operation mode;
wherein, in the image capture mode, a reading operation of noise signals and a reading operation of pixel signals are performed, and in the photometric operation mode, the reading operation of the noise signals is not performed and the reading operation of the pixel signals is performed,
and wherein in the photometric operation mode, the control unit controls the voltage source to apply the predetermined voltage instead of the noise signals.

6. The imaging apparatus according to claim 3, wherein the photometric operation mode includes a first photometric operation mode in which the averaging unit performs averaging of the second signals of a first number of pixels and a second photometric operation mode in which the averaging unit performs averaging of the second signals of a second number of pixels which is smaller than the first number, and the control unit selects the first photometric operation mode or the second photometric operation mode.

7. The apparatus according to claim 5, further comprising an averaging unit which averages signals of the plurality of pixels, wherein in the photometric operation mode, the control unit controls the averaging unit of the image sensor to average the pixel signals.

\* \* \* \* \*